Sept. 28, 1965  L. P. McGINNIS ETAL  3,208,879
ELECTRIC STORAGE DEVICE
Filed Feb. 6, 1963
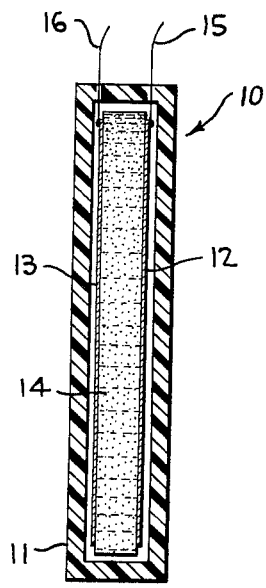
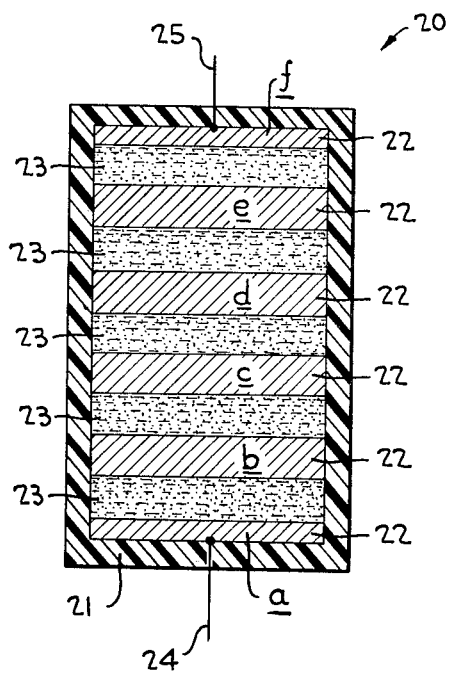
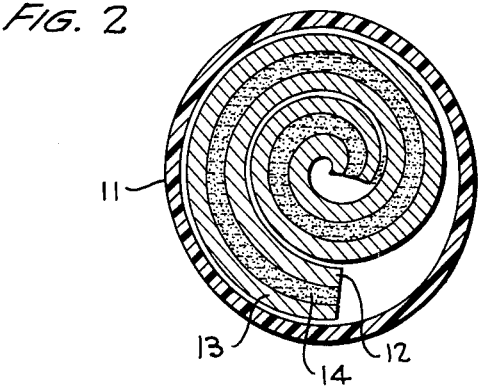
INVENTORS,
LAURENCE P. McGINNIS
WILLIAM J. PAULI
BY: Harry M. Saragovitz,
Edward J. Kelly, Herbert Berl & J. P. Edgerton

United States Patent Office 3,208,879
Patented Sept. 28, 1965

3,208,879
ELECTRIC STORAGE DEVICE
Laurence P. McGinnis, Adelphi, Md., and William J. Pauli, Washington, D.C., assignors to the United States of America as represented by the Secretary of the Army
Filed Feb. 6, 1963, Ser. No. 256,775
4 Claims. (Cl. 136—6)
(Granted under Title 35, U.S. Code (1952), sec. 266)

The invention described herein may be manufactured and used by or for the Government of the United States of America for governmental purposes without the payment to us of any royalty thereon.

This invention relates to electric storage devices, and more particularly to an improved electrical storage cell and battery which has a virtually unlimited storage life.

Power supply technology for large missile war heads and for conventional, small ammunition is well advanced. In these applications there is a need for a power supply which will lie inert in a system for perhaps years, and when needed, instantly produce the needed power. Thermal batteries have filled this need for military power supplies which can remain connected in a system for an indefinite period of time and are activated upon the application of heat. Such electrical storage devices as thermal batteries are, however, one shot devices, i.e. cannot be recharged when once activated, and have a very short discharge time. Further, the time necessary to generate the heat for the thermal battery may cause an objectionable delay in some applications.

It is therefore an object of this invention to provide a novel secondary electric storage cell and battery with a long storage life.

Another object of this invention is to provide a novel electric storage cell and a battery with a long storage life which is compact, lightweight, and inexpensive.

Still another object of the invention is to provide a novel secondary electric storage cell and battery having a long storage life and which may be electrically activated in a short time, yet will discharge over a long period of time.

A further object of the present invention is to provide a novel electric storage cell and battery which has an indefinite storage life, is maintenance free, and may be hermetically sealed, while capable of being quickly activated by an electric current.

A still further object of the present invention is to provide a novel electric storage cell and battery which has an indefinite storage life and may be repeatedly cycled and which does not gas or tree.

An additional object of the present invention is to provide a novel electric storage cell and battery which may be repeatedly recharged, and which is resistant to overcharging.

The specific nature of the invention as well as other objects uses and advantages thereof will clearly appear from the following description and from the accompanying drawing in which:

FIG. 1 is a sectional view of one embodiment of the electric storage device of this invention.

FIG. 2 is a sectional view of a "rolled" cell.

FIG. 3 is a sectional view of a plurality of stacked series connected cells.

In accordance with the teaching of this invention, the enrgy storage cell of this invention has two conducting electrodes, identical in composition, which are maintained in a spaced-apart relationship, with a metallic salt electrolyte, of a metal different from the electrode metal, in contact with the electrodes. Since the two electrodes are identical, this electric storage device may be stored in this condition for an unlimited period of time without any electro-chemical reaction. When the cell is to be activated, a current is caused to flow from one electrode to the other through the electrolyte causing a metal to be deposited on one electrode, and an insoluble salt of the electrode metal to be formed at the other electrode.

In the preferred embodiment of this invention the electrodes are silver, and the electrolyte is zinc chloride. While the concentration of the electroylte is not critical, a 25% to 30% aqueous solution was found to give the best results. However, where temperature considerations are a factor it may be desirable to use a 51% solution of the zinc chloride which is the eutectic mixture.

When a current is passed between the electrodes, silver chloride is formed at the positive plate, and the negative electrode is coated with zinc. After the silver chloride and the zinc have been formed, when an electrical load is connected to the electrodes the cell acts as a zinc-silver chloride cell. The output E.M.F. of the electrical storage cell in its charged condition is about 0.9 volt.

The silver chloride formed at the positive electrode is insoluble, which prevents it from leaving the electrode, and causes a continuous layer of silver chloride to form on the electrode. As silver chloride builds up on the electrode, when a charging current is passing through the cell, the resistance of the cell increases. This increasing resistance tends to limit the charging current, and prevent overcharge.

The system involved in the preferred operation of the electric storage cell and battery of this invention is:
When uncharged, $Ag/ZnCl_2/Ag$
When charged, $Ag,Zn/Cl_2/AgCl,Ag$ During the charge one silver electrode, which will be the negative of the battery, receives zinc and the other electrode is oxidized to the AgCl, thereby removing anions and cations from the electrolyte causing the solution to become weaker. The discharge of the cell is that of a zinc-silver chloride cell producing approximately a 0.9 volt E.M.F. There are no side actions and all of the products on both charge and discharge are non-gaseous which allows the cell to be hermetically sealed if desired.

FIG. 1 shows a simple electric storage cell embodying the principles of this invention. An unchanreg cell 10 has a case 11 and two chemically identical silver electrodes 12 and 13. The case 11 is preferably of an insulating material such as a plastic and may be air tight, since there are no gaseous products even under a high charge rate. With no gas there will be no pressure build upon and if desired the case 11 may be merely a wax impregnated paper.

The container 11 may if desired be filled with the liquid electrolyte. However, in the preferred embodiment shown a piece of inert absorbent material, such as glass cloth or the like shown at 14, is interposed between the electrodes 12 and 13. The electrolyte, $ZnCl_2$ solution, saturates this absorbent material 14, and thereby contacts the electrodes while the pad 14 still permits the necessary ion migration. At the same time the material 14 serves as a mechanical spacer for the electrodes.

In normal operation, although it is not necessary, the cell 10 is charged with a high current short duration pulse just before use by means of leads 15 and 16 which are connected to the electrodes 12 and 13 respectively. After the cell has been charged, the same leads deliver energy to the load. The leads 15 and 16 are also preferably made of silver to prevent any secondary reaction from taking place due to the leads.

The sandwich type construction shown in FIG. 1 may be used to construct a "rolled" cell as shown in FIG. 2. A cell constructed in this manner has an increased energy storage capacity without greatly increasing the volume of the cell. The same reference numbers have been used as in FIG. 1. The electrodes are 12 and 13, the absorbent pad is 14, and the casing is 11. The casing 11 may be simply a coating applied after the cell has been rolled.

If desired several cells may be connected in series in order to increase the output voltage. A preferred method of connecting several cells in series, which eliminates the need for external connections is shown in FIG. 3. As shown, an electric storage battery 20 has an insulating container 21 which houses a plurality of silver electrodes 22 and a plurality of absorbent pads 23. The absorbent pads 23 contain the electrolyte, zinc chloride solution. The only leads are the external leads 24 and 25. The case 21 is tightly fitted to the electrodes 22 so that none of the electrolyte on the pads 23 will seep past the electrodes.

When a charging current pulse is applied to the leads 24 and 25, assuming the electron flow is from 24 to 25, the first electrode $a$ is coated with zinc and silver chloride is formed on the second electrode $b$. The other side of the electrode $b$ is coated with zinc similarly to the first electrode $a$. Each of the remaining electrodes $c$, $d$, and $e$ receive a different film on either side of the electrode the same as electrode $b$. Silver chloride is formed on the last electrode $f$ and the battery is complete between the leads 24 and 25.

It will be apparent that the embodiment shown is only exemplary and that various modifications can be made in construction and arrangement within the scope of the invention as defined in the appended claims.

We claim:

1. An inert hermetically sealed rechargeable electric storage cell having an unlimited storage life and which may be activated by a short-duration high-current electric pulse, comprising:
    (a) a pair of silver electrodes substantially identical in composition;
    (b) a zinc chloride electrolyte in contact with said silver electrodes, whereby a short-duration high-current electric pulse causes zinc to be coated on one of said silver electrodes and insoluble silver chloride being formed at said other of said silver electrodes; and
    (c) a hermetically sealed container enclosing said silver electrodes and said zinc chloride electrolyte.

2. An inert hermetically sealed rechargeable electric storage cell as recited in claim 1 further comprising: a non-electrically conducting, chemically inert and absorbent material saturated by said zinc chloride electrolyte and permitting free ion migration therethrough, said absorbent material providing mechanical separation of said silver electrodes.

3. An inert hermetically sealed rechargeable electric storage battery having an unlimited storage life and which may be activated by a short-duration high-current electric pulse comprising:
    (a) a first silver electrode and a second silver electrode and at least one additional silver electrode substantially identical in composition and arranged in stacked relationship, each of said silver electrodes having a first exposed surface and a second exposed surface;
    (b) a plurality of zinc chloride electrolytes equal in number to one less than the number of silver electrodes, each of said plurality of zinc chloride electrolytes in contact with the first exposed surface of one silver electrode and the second exposed surface of an adjacent silver electrode, whereby a short-duration high-current electric pulse causes zinc to be coated on corresponding exposed surfaces of said silver electrodes which are in contact with said zinc chloride electrolytes and insoluble silver chloride being formed at the corresponding other exposed surfaces of said silver electrodes which are in contact with said zinc chloride electrolytes;
    (c) a hermetically sealed container enclosing said silver electrodes and said zinc chloride electrolytes and preventing communication between said zinc chloride electrolytes; and
    (d) a first terminal and a second terminal passing through said hermetically sealed container and connected to said first silver electrode and to said second silver electrode, respectively.

4. An inert hermetically sealed rechargable electric storage battery as recited in claim 3 further comprising: a plurality of non-electrically conducting, chemically inert and absorbent materials corresponding in number to the number of said plurality of zinc chloride electrolytes, each of said absorbent materials saturated by one of said zinc chloride electrolytes and permitting free ion migration therethrough, said absorbent materials providing mechanical separation of said silver electrodes.

References Cited by the Examiner

UNITED STATES PATENTS 2,831,045  4/58  Harding _____ 136—83
2,906,802  9/59  Andre _____ 136—6

OTHER REFERENCES

Mrgudich: Journal of the Electrochemical Society, vol. 107, June 1960, pages 475–479.

WINSTON A. DOUGLAS, *Primary Examiner.*

MURRAY TILLMAN, *Examiner.*